(12) United States Patent
Bohrer et al.

(10) Patent No.: US 8,255,591 B2
(45) Date of Patent: Aug. 28, 2012

(54) METHOD AND SYSTEM FOR MANAGING CACHE INJECTION IN A MULTIPROCESSOR SYSTEM

(75) Inventors: Patrick Joseph Bohrer, Austin, TX (US); Ahmed Gheith, Round Rock, TX (US); Peter Heiner Hochschild, New York, NY (US); Ramakrishnan Rajamony, Austin, TX (US); Hazim Shafi, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 2111 days.

(21) Appl. No.: 10/948,407

(22) Filed: Sep. 23, 2004

(65) Prior Publication Data

US 2006/0064518 A1   Mar. 23, 2006

(51) Int. Cl.
*G06F 13/28* (2006.01)
(52) U.S. Cl. .................................... 710/22; 711/165
(58) Field of Classification Search .............. 710/22, 710/23; 712/1, 10
See application file for complete search history.

(56) References Cited

U.S. PATENT DOCUMENTS

| | | | | |
|---|---|---|---|---|
| 5,428,799 A * | 6/1995 | Woods et al. | ............. | 710/266 |
| 5,588,131 A * | 12/1996 | Borrill | ............. | 711/146 |
| 5,784,697 A * | 7/1998 | Funk et al. | ............. | 711/170 |
| 5,802,576 A * | 9/1998 | Tzeng et al. | ............. | 711/146 |
| 5,850,558 A * | 12/1998 | Qureshi et al. | ............. | 710/269 |
| 6,021,456 A * | 2/2000 | Herdeg et al. | ............. | 710/260 |
| 6,029,223 A * | 2/2000 | Klein | ............. | 710/266 |
| 6,604,060 B1 * | 8/2003 | Ryan et al. | ............. | 702/186 |
| 6,658,537 B2 * | 12/2003 | Hughes et al. | ............. | 711/141 |
| 6,711,650 B1 * | 3/2004 | Bohrer et al. | ............. | 711/118 |
| 7,159,216 B2 * | 1/2007 | McDonald | ............. | 718/100 |
| 2002/0065998 A1 * | 5/2002 | Buckland | ............. | 711/162 |
| 2004/0128450 A1 * | 7/2004 | Edirisooriya et al. | ........ | 711/141 |
| 2005/0033948 A1 * | 2/2005 | Wei | ............. | 713/1 |

OTHER PUBLICATIONS

Faye A. Briggs and Michel Dubois, "Performance of Cache-Based Multiprocessors", Jun. 1986, School of Electrical Engineering Purdue University. pp. 181-190.*
Aleksandar Milenkovic and Veljko Milutinovic, "Cache Injection on CAche Based Multiprocessors", Oct. 1998, School of Engineering, University of Belgrade.*
Veljko Milutinovic, Aleksandar Milenkovic, and Gad Sheaffer, "The Cache Injection/Cofetch Architecture: Initial Performance Evaluation", Jan. 1997, Proceedings Fifth International Symposium. pp. 63-64.*
Ben Verghese, "Operating System Support for improving Data Locality on CC-NUMA Compute Servers", 1996, pp. 279-289.*

\* cited by examiner

*Primary Examiner* — Elias Mamo
(74) *Attorney, Agent, or Firm* — Mitch Harris, Atty at Law, LLC; Andrew M. Harris; Libby Z. Toub (57) ABSTRACT

A method and apparatus for managing cache injection in a multiprocessor system reduces processing time associated with direct memory access transfers in a symmetrical multiprocessor (SMP) or a non-uniform memory access (NUMA) multiprocessor environment. The method and apparatus either detect the target processor for DMA completion or direct processing of DMA completion to a particular processor, thereby enabling cache injection to a cache that is coupled with processor that executes the DMA completion routine processing the data injected into the cache. The target processor may be identified by determining the processor handling the interrupt that occurs on completion of the DMA transfer. Alternatively or in conjunction with target processor identification, an interrupt handler may queue a deferred procedure call to the target processor to process the transferred data. In NUMA multiprocessor systems, the completing processor/target memory is chosen for accessibility of the target memory to the processor and associated cache.

27 Claims, 4 Drawing Sheets

METHOD AND SYSTEM FOR MANAGING CACHE INJECTION IN A MULTIPROCESSOR SYSTEM

This invention was made with Government support under NBCH020056 awarded by the DARPA HPCS program Phase 1. THE GOVERNMENT HAS CERTAIN RIGHTS IN THIS INVENTION.

BACKGROUND OF THE INVENTION

1. Technical Field

The present invention relates generally to processors and computing systems, and more particularly, to a cache injection mechanism to accelerate input/output (I/O) operations in multiprocessor systems.

2. Description of the Related Art

Present-day multiprocessor systems are gravitating toward a truly distributed architecture. As opposed to the symmetrical multi-processing (SMP) or uniform memory access (UMA) model, in which memory and devices are typically available to and accessible by all processors within the processing system at a similar latency, non-uniform memory access (NUMA) systems generally include localized memory and devices that are either not readily accessible to all processors in the system or have a high performance cost due to higher latency. As such, when a direct memory access (DMA) transfer is made between one memory and another memory or I/O device, the memory image of the transfer may not be located such that the processor that processes the transferred data can quickly access the DMA memory image, as the DMA transfer target memory (the memory to which the transfer is made) may be located remotely from the above-identified processor. Data transferred into memory via DMA typically requires some processing, such as in systems where network packets are received by a network interface. Network packet processing typically requires multiple processing operations before the data is consumed by its end-point process. For example, the packets might be examined by an initial interrupt handler, followed by some communication protocol processing before reformatted packets are finally delivered to the process responsible for using the data included in the packets. Since cache misses require additional time to be handle, it would be desirable to provide methods to reduce cache misses due to various I/O operations in a multiprocessor system.

Further, in multiprocessor systems in general, cache memories (caches) are typically tightly coupled to a single processor or a small group of processors and supply the processor(s) with data from a system memory that may or may not be symmetrically available to each processor. In some multiprocessor systems, a central system memory is not present at all, and the entire memory consists of the collection of local memories of all of the processors. While each processor may access remote memories located in other processing nodes, such accesses are typically conducted through bus bridges or high-speed network interconnects for which access time to the memory is greatly increased over the access time for memory that is local or tightly-coupled to the accessing processor.

U.S. Pat. No. 6,711,650, the specification of which is herein incorporated by reference, discloses a mechanism for accelerating the processing of data transferred by a DMA transfer. The acceleration technique is known as "cache injection". Data is transferred or "injected" into a cache during the DMA transfer into system memory, thus reducing or eliminating the delay associated with subsequently loading the data into cache for use by the processor. By directly loading existing cache lines that would otherwise be invalidated by the DMA write to the associated blocks of memory, the cache lines affected do not have to be marked invalid, thus avoiding the cache miss penalties that would otherwise occur and eliminating the need to reload the cache lines in response to the miss. Further, the above-described cache injection technique can avoid a cache load operation when space is available for allocation of new cache lines for DMA transfer locations that are not yet mapped into the cache. Also, when a cache line to be injected is not present in the cache and space is either unavailable or the cache controller is unable to allocate new lines for DMA transfer locations that are not already mapped, the controller need take no action; standard DMA transfer processing takes place and the memory is guaranteed to have the most up-to-date copy of the data.

Cache injection is thus very useful in uniprocessor systems, as the time required to process DMA operations is reduced overall, thus improving I/O device operations and operations where DMA hardware is used to transfer memory images to other memories. The cache injection occurs while the DMA transfer is in progress, rather than occurring after a cache miss when the DMA transfer completion routine (or other subsequent process) first accesses the transferred data.

However, using typical cache injection techniques such as that described in the above-incorporated patent, in a multiprocessor system such as an SMP or NUMA system provides additional challenges. In any multiprocessor environment, the cache loaded by the cache injection technique may not be located proximate the processor that executes the DMA transfer completion routine or other routine that operates on or examines the transferred data. In a NUMA system, the memory image from the DMA transfer may not be in a memory that is quickly accessible to the processor that consumes or processes the transferred data. For example, if the data is transferred to the local memory of another processor, accesses to the memory address ranges corresponding to that "remote" memory (i.e., the local memory of the other processor) would typically require transfer via a high-speed interconnect network or through a bus bridge, increasing the time required to access the data for processing.

Further, the processor cache or outboard cache of the process that eventually processes the DMA-transferred data might not be loaded by the cache injection mechanism described in the above-incorporated patent or if a cache was loaded, it could be a cache coupled to the wrong processor (i.e., the processor that does not execute the DMA transfer completion routine).

It is therefore desirable to provide a method and system that can manage cache injection in a multiprocessor system. It would further be desirable to provide such a method and system that can manage cache injection in both UMA and NUMA multiprocessor systems.

SUMMARY OF THE INVENTION

The objective of managing cache injection in a multiprocessor system is accomplished in a method and system. The system includes a cache controller that supports cache injection and program instructions for targeting a processor for processing of a DMA completion routine, in accordance with an embodiment of the present invention.

The method includes enhancements to the program instructions comprising the operating system of a computing system. The enhancements either detect the target processor for DMA data processing or the enhancements direct processing of DMA data processing to a particular processor, thereby enabling cache injection to a cache that is tightly coupled to the target processor. The target processor executes program instructions that handle subsequent processing of the data injected into the cache.

The identification of a target processor can be made in accordance with detecting the processor handling an interrupt request indicating the completion of the DMA transfer. Alternatively or in combination, the DMA completion interrupt handler can direct execution of the DMA completion routine or other process that uses the transferred data to the target processor by queuing the DMA completion routine or other process for execution on the target processor.

In NUMA multiprocessor systems, the target processor, or the target memory are further chosen in conformity with a requirement that the target memory be tightly coupled to the target processor and cache.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

Figure 1:
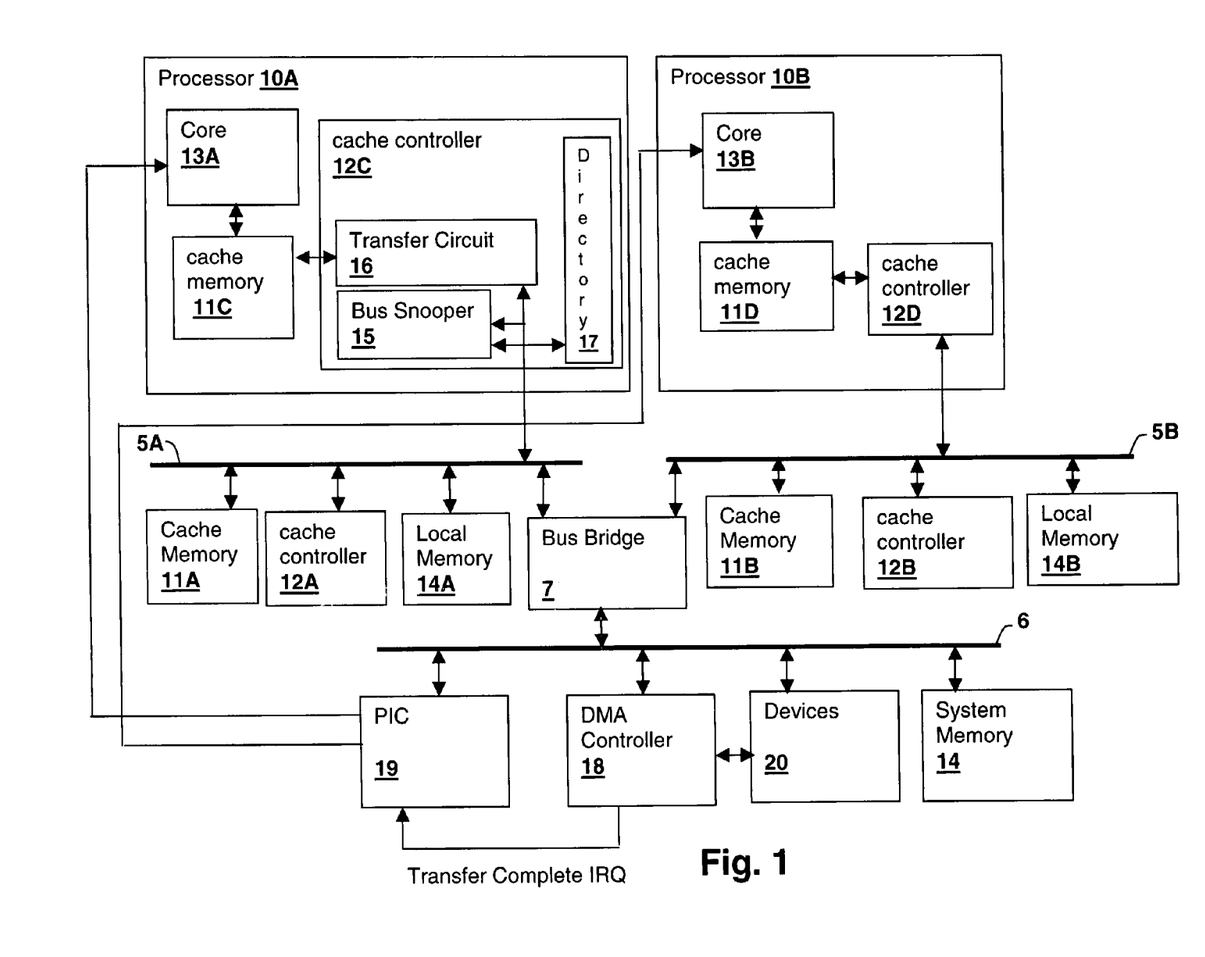
FIG. 1 is a block diagram of a processing system in accordance with an embodiment of the invention.

With reference now to the figures, and in particular with reference to FIG. 1, there is depicted a block diagram of a system in accordance with an embodiment of the present invention. In the depicted system, access to a system memory 14 is symmetrical and the depicted system will be used to describe operation of an SMP multiprocessor system in accordance with an embodiment of the present invention, even though it should be noted that access to optional local memories 14A and 14B are non-uniform. It should be understood that the depicted embodiment is only one simplified example of a multiprocessor system and that the SMP operation illustrated thereby could also be found in portions of a NUMA multiprocessor system and therefore the described operation could be applied to such portions of a NUMA multiprocessor system.

Processors 10A and 10B are identical processors each coupled to a unique local bus 5A, 5B that provides interconnection of each processor with an associated lower-level cache memory 11A, 11B, lower-level cache controller 12A, 12B, and local memory 14A, 14B (if present). A bus bridge 7 connects local buses 5A and 5B to a system bus 6 to which a programmable interrupt controller 19, a DMA controller 18 (which could be included in bus bridge 7), various I/O devices 20 and a system memory 14 are attached. Each processor 10A, 10B includes a core 13A, 13B coupled to a cache memory 11C, 11D that is managed by a cache controller 12C, 12D. Cache controller 12C is depicted in detail as including a cache directory 17 that tracks the status of each cache line via flags that indicate whether the line is valid, and other status bits, along with tags that indicate the corresponding addresses in memory with which each valid tag line is associated. Cache controller 12C also contains a bus snooper 15 that observes transactions on bus 5A (5B for cache controller 12D) so that accesses to memory that affect memory locations associated with a valid cache line can be noticed and cache directory 17 will be updated as necessary. Note that the memory locations mapped in cache memory 11C may include locations in local memories 14A, 14B as well as locations in system memory 14. However, local memory 14B is remote from processor 10A as accesses must pass through bus bridge 7, and if cache controller 12D were configured to inject data into cache memory 11D from a DMA transfer to local memory 14B, then it would be desirable for processor 10B to handle processing of the DMA-transferred data rather than processor 10A.

In the present invention, bus snooper 15 is also used to observe DMA transactions to any memory location, so that DMA transfer data can be injected into cache memory 11C lines to accelerate DMA transfer processing, if processor 10A is either selected or identified as the target processor, i.e., the processor that will process the DMA-transferred data. Transfer circuit 16 provides the mechanism for transferring data from memory 14, 14A, 14B to cache memory 11C and is directed by cache controller 12C to transfer values forming part of a DMA transfer into cache memory 11C during the DMA transfer. Thus, directory 17 can maintain the valid status of a cache line affected by the DMA transfer, as the cache line will be updated during the DMA transfer. The cache data reflecting the transferred data will be valid before execution of DMA completion routines and subsequent processes that "touch" the resulting transferred values.

Similar to the above description, cache controllers 12A and 12B incorporate similar cache injection mechanisms for populating lower-level cache memories 11A and 11B with DMA-transferred data. In general, if the memory addresses of data transferred via DMA to one of memories 14, 14A or 14B are mapped in any of cache memories 11A-11D, the affected cache lines will be injected as the transfer commences. If a cache line does not exist for the target cache, then lines will be allocated if determined to be available according to the cache allocation algorithm. If no line is allocated, no action needs to be taken with respect to the data, as the next access to a memory location that is not loaded into a cache line will result in a cache miss and a cache line will be loaded with the values from memory.

DMA transfers in the context of the present invention may include transfers from devices 20 to system memory 14 (or one of local memories 14A or 14B) via DMA controller 18, transfers to system memory 14 from other memories (not shown) on bus 6, transfers from one location in system memory 14 from other locations in system memory 14 directed by DMA controller 18 or DMA transfers between system memory and one of local memories 14A and 14B). The DMA transfer may be detected at bus snooper 15 by a bus command decode or a special address bit that indicates that a DMA transfer is being performed, or a range of memory addresses may be uniquely allocated for DMA transfers and bus snooper 15 then detects writes to that memory range. However, in order for transfers occurring solely between devices 20 and memory 14 on bus 6 to be seen by the higher-level cache controllers 12C, 12D, bus bridge 7 must snoop transactions on bus 6 and reflect those transactions on bus 5A or bus 5B so that a bus snooper in cache controller 12C or 12D will "see" the transaction in order to perform the associated cache injection. A per-processor range may also be used to target a particular bus snooper to load its associated cache. Further, a processor/cache ID may be made part of the bus protocol, specifically targeting a particular processor/cache for cache injection.

In response to the detection of a DMA transfer, transfer circuit 16 commences transfer of the DMA transfer values to cache memory 11C lines that are affected by the transfer and may also optionally transfer values into new lines allocated for the DMA transfer by cache controller 12A if space for the new lines is available (either by unused/invalid/empty line detection or by a cast-out algorithm that recognizes a certain priority for DMA transfer data). At the end of the DMA transfer, DMA controller 18 generates an interrupt request to PIC 19, which interrupts one of processors 10A or 10B. PIC 19 includes an interrupt mask register that permits selection of which processor 10A, 10B to interrupt for a given interrupt request (IRQ) and therefore the interrupt generated upon DMA transfer completion may be assigned to either of processors 10A, 10B.

The present invention primarily concerns a methodology for ensuring that the processor 10A, 10B that executes the DMA completion routine or subsequent DMA data processing process (i.e., the program instructions that operate on the DMA-transferred values) is the processor that is closely coupled to (or contains) the cache that has been injected with the transferred values. In general, there are two ways to accomplish this task: either identify the processor coupled to the injected cache and schedule the DMA data processing routine or process for execution on that processor, or select the "target" processor in advance, thereby specifying the cache to inject with the DMA transfer values and the processor that will execute the DMA completion routine or other DMA data handling process. Even if it is not possible to exactly identify the target processor, if a target processor group or node can be determined so that a memory more "local" to the target processor can be located, then the transfer can be made to that memory and injected into a lower-level cache such as cache 11A that is accessible to the group in which the target processor is located.

One way to identify a previously targeted processor is to set PIC 19 mask registers so that the targeted processor handles the DMA completion interrupt. As long as the interrupt handling program instructions can schedule the DMA completion routine or other processing for execution on the processor handling the interrupt, the target processor will handle processing of the DMA-transferred data. In general, modifications to existing operating systems consistent with the operation of the present invention will be required. DMA transfer handling generally requires cooperation of a device driver and the operating system, although certain DMA transfer functions maybe considered as wholly controlled by the operating system.

Yet a third component may be involved with the handling of data injected into a cache from a DMA transfer: an "application level" process (user mode process) or thread that processes or consumes the data (the distinction being that consuming the data implies an endpoint from which no further access to that particular memory image is made). Thus, control of the operating system scheduling, depending on the final endpoint and the type of execution thread(s) processing or consuming the data, might extend to direction of application level processes and/or threads for execution on the target processor, as well as driver-level threads. In fact, if the driver level threads do not manipulate the DMA-transferred data in any way, then the driver level threads could be permitted execution on another processor, as long as subsequent threads that manipulate the data can be directed to the target processor. Such a situation appears to exist in WINDOWS NT and XP operating systems (products of Microsoft Corporation) where direction of driver-level deferred procedure call (DPC) execution to a particular processor is not part of the DPC initialization or queuing services. In order to effectively implement the techniques of the present invention on such an operating system, it would be necessary to modify the DPC kernel interfaces or handle the tasks of targeting the processor within the operating system itself, either by pinning the DPC execution to the queuing processor (and thus generally pinning DPC execution to the processor that handled the DMA completion interrupt) or permitting drivers to queue DPCs to particular processors. However, if the driver does not access the DMA-transferred data at all, control of the processor that executes a user-mode process is possible under WINDOWS NT and XP. In the particular case where a driver does not have to access the data, driver routines can be scheduled on any processor as long as the user-mode process that accesses the data is scheduled on the target processor. Another alternative is to operate on the DMA completion data in the interrupt handling routine, but this may not be practical for all operating system architectures, as some restrict access to particular services and environments at interrupt time.

An alternative requires that the operating system provide identification of the processor that will handle the interrupt and/or execute any of the above-mentioned routines that will access the DMA-transferred data by providing an interface that identifies a specific processor given a particular interrupt identifier and enforcing execution of associated threads via the DPC processor specification and user mode processor specification interfaces. Once the processor is identified, the associated cache can be targeted via the above-described targeting techniques, including per-processor address ranges or cache/processor identification via the bus signals associated with the DMA transfer. The targeted processor can be set for execution by storing the processor ID in a structure for managing the DMA transfer, or by the interrupt direction mechanism described above by programming the mask registers in PIC 19 to interrupt the target processor. Generally this could be accomplished by specifying a processor when enabling or initializing an interrupt object. The hint bit forming part of the command or address information on the bus in the alternative DMA processor identification technique described above may also be used to identify the particular cache if the hint bit is extended to include a processor selector/cache selector. The DMA setup routines in the operating system may be modified to specify a particular processor/cache for cache injection so that a device driver (or operating system component) can target a processor and the hint information would then be sent by the DMA controller when the transfer is in progress. In addition, some changes to the DMA transfer descriptors maintained by device drivers or the operating system at the DMA controllers may be needed, depending on the particular operating system/device driver implementation.

Figure 2:
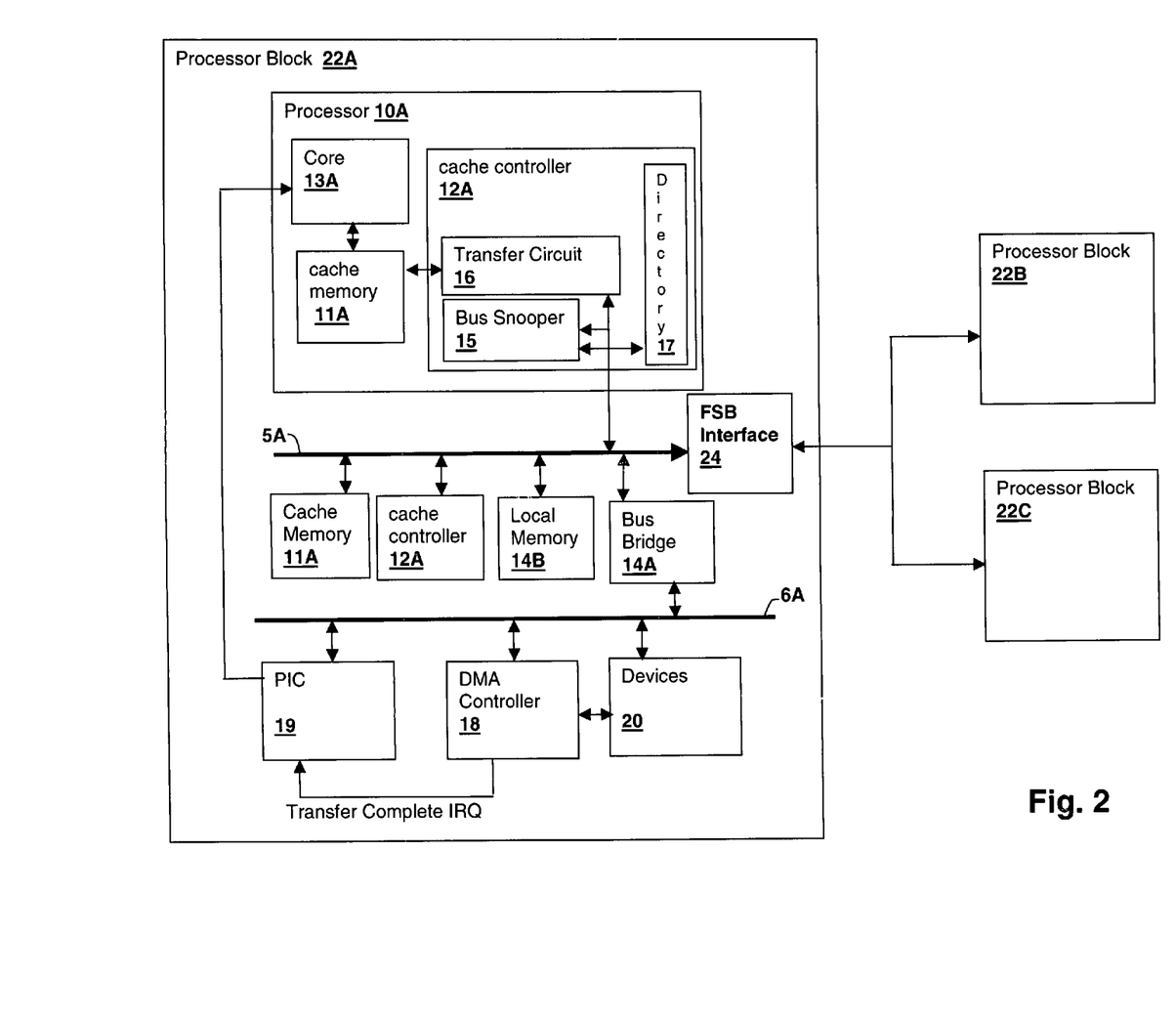
FIG. 2 is a block diagram of a processing system in accordance with another embodiment of the invention.

Referring now to FIG. 2, a multiprocessor system in accordance with another embodiment of the present invention is depicted. Identical reference designators are used for blocks having identical functionality to the blocks depicted in FIG. 1 and in general, only differences between the two multiprocessor systems will be described. In system of FIG. 2, access to system memory is necessarily asymmetrical, as the memory is distributed amongst local memories (e.g., local memory 14A) and the depicted system will be used to describe operation of a NUMA multiprocessor system in accordance with an embodiment of the present invention.

Processor blocks (or "groups" or "nodes") 22A-22C are coupled via a local bus 5A front side bus (FSB) interface 24, forming a network of processor blocks in which system memory is entirely distributed. Memory ranges are uniquely assigned to particular physical memories and any access that requires retrieval from a remote memory (a local memory in another processing block) will result in a network transfer via FSB interface 24. Alternatively, or in addition to FSB interface 24, processor blocks 22A-22C may be coupled via a network interface connected to I/O bus 6A. Each processor block 22A-22C is coupled to local devices 20 and has its own DMA controller 18 and PIC 18 coupled via a bus bridge 7 to local bus 5A. DMA controller 18 may be incorporated within bus bridge 7 as in the system of FIG. 1.

In general, the difference between the operation of the system of FIG. 2 and the system of FIG. 1 is that a transfer to local memory 14A is not readily accessible to processor blocks 22B and 22C, which may happen, for example, when one of devices 20 transfers data via DMA to local memory 14A or when data is transferred from another processor block to local memory 14A. The lack of ready accessibility, i.e., increased latency due to a requirement to further transfer data via FSB interface 24 to another processor block 22B or 22C, indicates that a particular processor 10A and its associated cache memory 11C must be selected for cache injection in order to maintain efficiency in DMA transfer processing if the target memory is local memory 14A. However, it should be noted that a target memory can be selected in a remote DMA context, where the transfer is made to a memory that is remote from the target processor, while the cache injection is made to a cache that is tightly coupled to the target processor. As long as all of the cache lines are injected, no penalty will occur at all due to transfer to a remote memory.

The identification of "proximity" or how "tightly coupled" the DMA transfer memory image is to a processor/cache combination can be generally determined via an affinity map. An affinity map is a set of operating system data structures used to describe the underlying hardware architecture of the system platform and is generally at tree structure built by an enumeration process at system startup. Using the affinity map, it is possible to determine what devices (including processors and memories) are connected to which buses and thus what the effective "distance" or latency is between a processor/cache combination and a device or memory. Therefore, in the NUMA system described above, a further step of determining the appropriate processor to handle the DMA completion routine and therefore which cache to inject is made in conformity with the latency between the cache receiving the cache injection and the memory to which the data is being transferred. Therefore also, in a NUMA multiprocessor system, at least with respect to asymmetrical portions of such a system, the processor/cache combination is generally directed and not subsequently identified after a transfer, as is possible in SMP systems or symmetric portions of NUMA systems. The routine setting up the DMA transfer would select the target processor/cache combination based on the information provided by the affinity map to minimize the latency between the device and the target memory and the target memory and the cache/processor or vice versa (if the target processor is specified, the cache and memory can be selected by their affinity to the processor).

Figure 3:
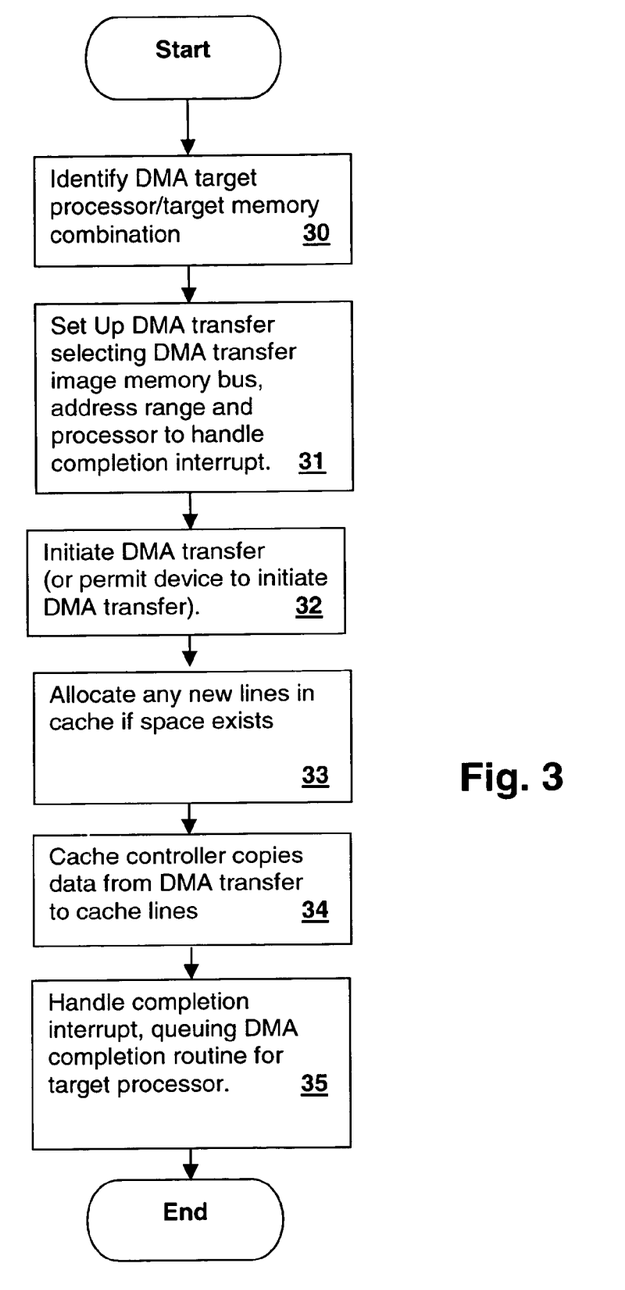
FIG. 3 is a flowchart depicting a method in accordance with an embodiment of the present invention.

Referring now to FIG. 3, a method in accordance with an embodiment of the invention is depicted in a flowchart. The depicted method is an example of the a priori-identified processor technique described above. First, the DMA target processor and target memory are identified (step 30). Then, the DMA transfer is set up by selecting the DMA transfer image bus, address range and the processor to handle the DMA completion interrupt (step 31). Then, the DMA transfer is initiated or a device is permitted to initiate DMA transfer and does so (step 32). While the DMA transfer is in progress, the cache controller that manages the target cache identifies cache lines that are already mapped and copies data from the DMA transfer to cache lines in the target cache (step 34), allocating any new lines required if space is available prior to copying the line (step 33). Finally, the DMA transfer completion interrupt is handled and the DMA completion routine is queued for the target processor (step 35).

Figure 4:
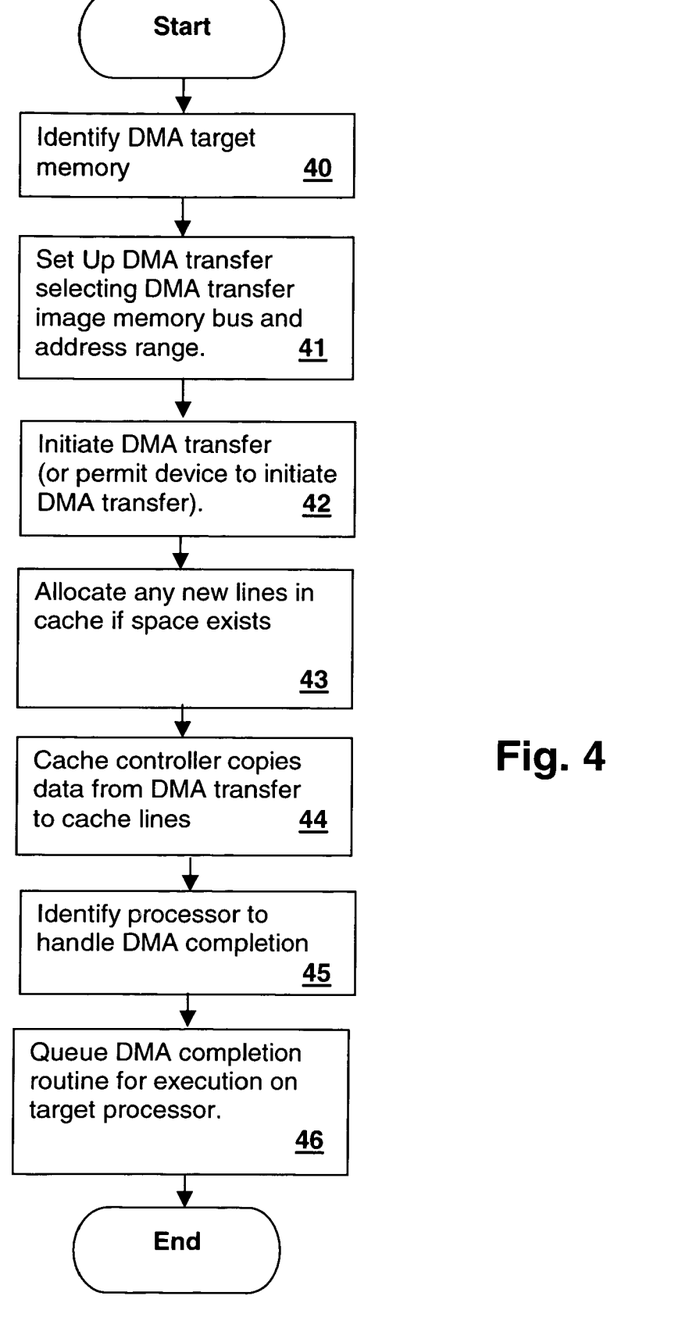
FIG. 4 is a flowchart depicting a method in accordance with another embodiment of the present invention.

Referring now to FIG. 4, a method in accordance with another embodiment of the invention is depicted in a flowchart. The depicted method is an example of the post priori-identified processor technique described above. First, the DMA target memory is identified (step 40). Then, the DMA transfer is set up by selecting the DMA transfer image bus and address range (step 41). Then, the DMA transfer is initiated or a device is permitted to initiate DMA transfer and does so (step 42). While the DMA transfer is in progress, the cache controller that manages the target cache copies data from the DMA transfer to cache lines in the target cache (step 44), allocating any new lines required if space is available prior to copying the line (step 43). Finally, the DMA transfer completion interrupt is handled and the processor coupled to the injected cache is identified (step 45). The DMA completion routine is then queued for the target processor (step 46).

With either of the above methods, if a cache line corresponding to any DMA transfer address exists, then the cache line will be updated by the cache injection mechanism and will remain valid after the DMA transfer. If a line did not previously exist in the cache, then either a new cache line will be present that contains the data or no entry will exist. Therefore, cache coherency is maintained through the DMA transfer process without requiring insertion of false cache misses, invalidation of cache lines or other mechanisms used to update the cache.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method for performing a direct memory access (DMA) transfer within a processing system including multiple processors, said method comprising:
   initiating said DMA transfer to a DMA transfer target memory image within a DMA transfer target memory over a bus;
   determining in a cache controller managing a cache memory associated with a particular one of said multiple processors that said DMA transfer is occurring on said bus;
   responsive to determining that said DMA transfer is occurring, copying data being transferred in said DMA transfer to a cache line in said cache memory during said DMA transfer; and
   targeting said particular processor for executing a routine that accesses memory addresses of said DMA transfer target memory image, whereby said particular processor processes data transferred by said DMA transfer, wherein said targeting comprises identifying said particular processor subsequent to completion of said DMA transfer, and further comprising queuing said routine for execution by said particular processor.

2. The method of claim 1, further comprising generating an interrupt in response to completion of said DMA transfer, and wherein said identifying and queuing are performed in response to said interrupt, whereby another processor handling said interrupt schedules execution of said routine on said particular processor.

3. The method of claim 1, processing system is a non-uniform memory access (NUMA) multiprocessor system and further comprising selecting said particular processor in conformity with a latency between said cache memory and said DMA transfer target memory.

4. The method of claim 1, wherein said targeting comprises:
  selecting said particular processor prior to said initiating;
  selecting said cache memory in conjunction with selecting said particular processor; and
  directing execution of said routine to said particular processor.

5. The method of claim 4, wherein said processing system is an non-uniform memory access (NUMA) multiprocessor system and wherein said particular processor is selected in conformity with a latency between said cache memory and said DMA transfer target memory.

6. The method of claim 4, further comprising generating an interrupt in response to completion of said DMA transfer, and wherein said directing is performed by setting an interrupt map directing handling of said interrupt to said particular processor.

7. The method of claim 6, wherein said interrupt map is an interrupt register mask in a programmable interrupt controller, and wherein said setting is performed by programming said programmable interrupt controller.

8. The method of claim 1, wherein said copying is performed in response to said cache controller determining that said cache line is present and valid in said cache memory, whereby said cache line is maintained in a valid state at a time of execution of said DMA completion routine.

9. The method of claim 1, wherein said copying is performed in response to said cache controller detecting that said cache line is not present in said cache memory, and further comprising allocating a line for storing said cache line in said cache memory prior to said copying.

10. A multiprocessor system, comprising:
  a plurality of processors each coupled to an associated one of a plurality of cache memories;
  at least one cache controller coupled to said associated cache memories, said at least one cache controller including a bus snooper for observing transfers on at least one bus coupling said cache memories to a memory and a transfer circuit for transferring data to cache lines managed by said cache controller in response to detecting that a direct memory access (DMA) transfer is taking place to said memory; and
  an executive program resident in a memory coupled to an executive processor of said multiprocessor system, comprising program instructions that initiate said DMA transfer to said memory, and program instructions that direct execution of a routine that accesses said data transferred to said cache lines by a particular processor associated with a particular cache containing said cache lines, wherein said executive program further comprises program instructions that identify said particular processor subsequent to completion of said DMA transfer, and program instructions that queue said routine for execution by said particular processor.

11. The multiprocessor system of claim 10, wherein said executive processor is one of said plurality of processors.

12. The multiprocessor system of claim 10, wherein said multiprocessor system is a non-uniform memory access (NUMA) multiprocessor system and wherein said executive program further comprises program instructions that select said particular processor in conformity with a level of transfer latency between said cache memory and said memory.

13. The multiprocessor system of claim 10, wherein said executive program further comprises program instructions that select said particular processor prior to said initiating, whereby said cache memory is selected by selection of said particular processor.

14. The multiprocessor system of claim 13, wherein said multiprocessor system is a non-uniform memory access (NUMA) multiprocessor system and wherein said program instructions that select said particular processor select said particular processor in conformity with a transfer latency between said cache memory and said memory.

15. The multiprocessor system of claim 13, wherein said executive program further comprises program instructions that handle an interrupt generated in response to completion of said DMA transfer, and wherein said program instructions that direct execution of said routine set an interrupt map directing handling of said interrupt to said particular processor.

16. The multiprocessor system of claim 15, wherein said interrupt map is an interrupt register mask in a programmable interrupt controller, and wherein said program instructions that direct execution of said routine set said interrupt map by setting a value of an interrupt mask register in said programmable interrupt controller.

17. The multiprocessor system of claim 10, wherein said bus snooper detects a hint bit present in a bus state decode of said at least one bus that indicates that write to said memory are part of said DMA transfer, and wherein said transfer circuit transfers data to said cache line in response to said bus snooper detecting that said hint bit is present.

18. The multiprocessor system of claim 10, wherein said bus snooper detects that an address of a write to said memory on said at least one bus indicates that said write is part of said DMA transfer, and wherein said transfer circuit transfers data to said cache line in response to said bus snooper detecting that said address indicates that said write is part of said DMA transfer.

19. The multiprocessor system of claim 18, wherein said bus snooper further determines that an address of a write to said memory on said at least one bus indicates that said DMA transfer is targeted for access by said particular processor, and wherein said transfer circuit transfers said values to said cache associated with said particular processor in response to a result of said address determining.

20. The multiprocessor system of claim 18, wherein said bus snooper further determines a processor/cache identifier from a bus state decode associated with said write, and wherein said transfer circuit transfers said values to said cache associated with said particular processor in conformity with said identifier.

21. A computer program product comprising computer-readable storage media encoding program instructions forming part of an executive program for execution by a processor within a multiprocessor system, said multiprocessor system including a cache controller with a cache injection feature that loads values into a cache memory during a direct memory access (DMA) transfer to a memory within said multiprocessor system, said values being at least a portion of data transferred by said DMA transfer, and said program instructions comprising program instructions that:

initiate said DMA transfer; and direct execution of a routine that accesses said values to a particular processor associated with said cache memory, whereby said particular processor processes said values, wherein said program instructions further comprise program instructions that: identify said particular processor subsequent to completion of said DMA transfer; and queue said routine for execution by said particular processor.

22. The computer program product of claim 21, wherein said multiprocessor system is a non-uniform memory access (NUMA) multiprocessor system and wherein said program instructions further comprise program instructions that select said particular processor in conformity with a level of transfer latency between said cache memory and said memory.

23. The computer program product of claim 21, wherein said program instructions further comprise program instructions that:

select said particular processor prior to said initiating, whereby said cache memory is selected by selection of said particular processor; and     direct execution of said routine to said particular processor.

24. The computer program product of claim 23, wherein said multiprocessor system is a non-uniform memory access (NUMA) multiprocessor system and wherein program instructions that select said particular processor select said particular processor in conformity with a transfer latency between said cache memory and said memory.

25. The computer program product of claim 23, wherein said program instructions further comprise program instruction that handle an interrupt generated in response to completion of said DMA transfer, and wherein said program instructions that direct execution of said routine set an interrupt map directing handling of said interrupt to said particular processor.

26. The computer program product of claim 25, wherein said interrupt map is an interrupt register mask in a programmable interrupt controller, and wherein said program instructions for setting program said programmable interrupt controller.

27. A method for performing a direct memory access (DMA) transfer within a processing system including multiple processors, the method comprising:

specifying a particular cache memory and an associated particular processor for handling data received from the DMA transfer using an affinity map that indicates latency relationships between a DMA transfer target memory and the multiple processors;

initiating the DMA transfer to a DMA transfer target memory image within the DMA transfer target memory over a bus using a bus protocol containing an indication of the particular cache memory and particular processor;

first determining in a cache controller managing a particular cache memory associated with a particular one of the multiple processors that the DMA transfer is occurring on the bus;

second determining from the bus protocol of the DMA transfer that the particular cache memory and the particular processor are specified by the bus protocol to handle the data received from the DMA transfer;

responsive to determining that the DMA transfer is occurring and that the particular cache memory is specified by the bus protocol, copying data being transferred in said DMA transfer to a cache line in said particular cache memory during said DMA transfer;

receiving an interrupt indicating completion of the DMA transfer;

executing an interrupt routine on one of the multiple processors other than the particular processor to handle the interrupt and schedule a deferred procedure call targeting said particular processor for execution; and     executing the deferred procedure call on the particular processor to access memory addresses of the DMA transfer target memory image, whereby the particular processor processes data transferred by said DMA transfer.

* * * * *